United States Patent [19]
Kono et al.

[11] Patent Number: 5,659,131
[45] Date of Patent: Aug. 19, 1997

[54] CUTTER FRACTURE DETECTING SYSTEM

[75] Inventors: Shinichi Kono; Junichi Tezuka, both of Minamitsuru-gun, Japan

[73] Assignee: Fanuc Ltd., Japan

[21] Appl. No.: 397,113

[22] PCT Filed: Jul. 21, 1994

[86] PCT No.: PCT/JP94/01205

§ 371 Date: Mar. 7, 1995

§ 102(e) Date: Mar. 7, 1995

[87] PCT Pub. No.: WO95/04631

PCT Pub. Date: Feb. 16, 1995

[30] Foreign Application Priority Data

Aug. 6, 1993 [JP] Japan ................... 5-195030

[51] Int. Cl.⁶ .................. B23Q 17/09; G01N 3/58
[52] U.S. Cl. ................................. 73/104; 408/16
[58] Field of Search ................ 73/104; 340/680; 364/474.17; 408/16

[56] References Cited

U.S. PATENT DOCUMENTS

| | | | |
|---|---|---|---|
| 3,299,697 | 1/1967 | Sparling | 73/104 |
| 3,809,870 | 5/1974 | Auble et al. | 73/104 X |
| 3,873,816 | 3/1975 | Takeyama et al. | 364/474.17 X |
| 4,558,311 | 12/1985 | Fursgren et al. | 73/660 X |
| 4,574,633 | 3/1986 | Ohauki et al. | 73/587 |
| 4,709,198 | 11/1987 | Ogo et al. | 364/474.17 X |
| 4,942,387 | 7/1990 | Thomas | 73/660 X |
| 5,298,889 | 3/1994 | Diei et al. | 73/104 X |
| 5,407,265 | 4/1995 | Hamidich et al. | 73/104 X |
| 5,440,213 | 8/1995 | Arita et al. | 318/568.11 |

FOREIGN PATENT DOCUMENTS

| | | |
|---|---|---|
| 55-25021 | 7/1980 | Japan . |
| 131856 | 6/1986 | Japan . |
| 164537 | 6/1989 | Japan . |
| 3-110606 | 5/1991 | Japan . |
| 196313 | 8/1991 | Japan . |

OTHER PUBLICATIONS

*Patent Abstracts of Japan* Grp M524,vol. 10, No. 299, Abs pub date Oct. 11, 1986 "Blade Lock Detector" by Chikamoto et al. (61–111877).

*Patent Abstracts of Japan* Grdm 532,vol. 10, No. 326, Abs pub date Nov. 6, 1986 "Decting method and Device of Abnormality in Cutting Tool" by Kitamura et al. (61–131856).

*Patent Abstracts of Japan* Grp M666, vol. 12, No. 4, Abs pub. Date Feb. 6, 1988 "Multi–Blade Tool Damage Detecting Device" by Inzazaki et al. (62–193749) and (62–193750) and (62–193751).

*Patent Abstracts of Japan* Grp M874, vol. 13, No. 432, Abs pub date Sep. 27, 1989 "Detection of Tool Anomoly by Main Spindle Revolution Speed Change Signal" by Sada et al. (1–164537).

*Primary Examiner*—Thomas P. Noland
*Attorney, Agent, or Firm*—Staas & Halsey

[57] ABSTRACT

A cutter fracture detecting system capable of easily detecting a fracture of a cutter having a plurality of cutting edges even when one of the cutting edges is broken. The cutter fracture detecting system has an observer for calculating a disturbance load torque of a spindle motor from a torque command value and a velocity feedback value, a band rejection filter for removing a given frequency component of the disturbance load torque which is determined by the number of cutting edges of the cutter and the rotational speed of the cutter, and a comparator for comparing an output signal from the band rejection filter with a predetermined reference value, and outputting a signal indicative of a fracture of the cutter when the output signal exceeds the predetermined reference value. In the event of a fracture of the cutter with plural cutting edges, a signal is generated that cannot be removed by the band rejection filter, and such a signal is monitored by the comparator.

3 Claims, 7 Drawing Sheets

CUTTER FRACTURE DETECTING SYSTEM

BACKGROUND OF THE INVENTION

1. Field of the Invention

The present invention relates to a cutter fracture detecting system for detecting a fracture of a cutter, and more particularly to a cutter fracture detecting system for detecting a fracture of a cutter which has a plurality of cutting edges.

2. Description of the Related Art

Unmanned operation of a numerically controlled machine tool for a long period of time requires that any fracture of the cutter be detected quickly for a cutter change.

To meet such a requirement, it has been customary to measure the load torque of a spindle, i.e., a drive current of a spindle motor, at all times, generate an alarm when the drive current reaches or exceeds a certain value, stop the machining process, and change the cutter.

However, in the case of a cutter having a plurality of cutting edges such as a milling cutter, the load current of the spindle motor remains substantially unchanged even if one of the cutting edges is broken, and hence it is difficult to detect such a cutter fracture.

SUMMARY OF THE INVENTION

In view of the aforesaid problems, it is an object of the present invention to provide a cutter fracture detecting system which is capable of easily detecting a fracture of a cutter having a plurality of cutting edges even when one of the cutting edges is broken.

To achieve the above object, there is provided in accordance with the present invention a cutter fracture detecting system for detecting a fracture of a cutter which has a plurality of cutting edges, comprising an observer for calculating a disturbance load torque of a spindle motor from a torque command value and a velocity feedback value, a band rejection filter for removing a given frequency component of the disturbance load torque which is determined by the number of cutting edges of the cutter and the rotational speed of the cutter, and a comparator for comparing an output signal from the band rejection filter with a predetermined reference value, and outputting a signal indicative of a fracture of the cutter when the output signal exceeds the predetermined reference value.

The observer calculates a disturbance load torque free of acceleration and deceleration components from a torque command value and a velocity feedback value. The disturbance load torque generally contains a certain frequency component which is determined by the number of cutting edges of the cutter and the rotational speed of the cutter, and such a frequency component can usually be removed by the band rejection filter. In a normal condition, the output signal from the band rejection filter contains a very little frequency component. When even one of the cutting edges of the cutter is broken, its frequency component is varied and falls outside of the rejection band of the band rejection filter. Since the frequency component cannot be removed by the band rejection filter, the band rejection filter produces an output signal of increased level. When the output signal from the band rejection filter is compared with a predetermined reference value, therefore, the fracture of the cutting edge of the cutter can be detected.

DETAILED DESCRIPTION OF THE PREFERRED EMBODIMENTS

An embodiment of the present invention will hereinafter be described below with reference to the drawings.

Figure 2:
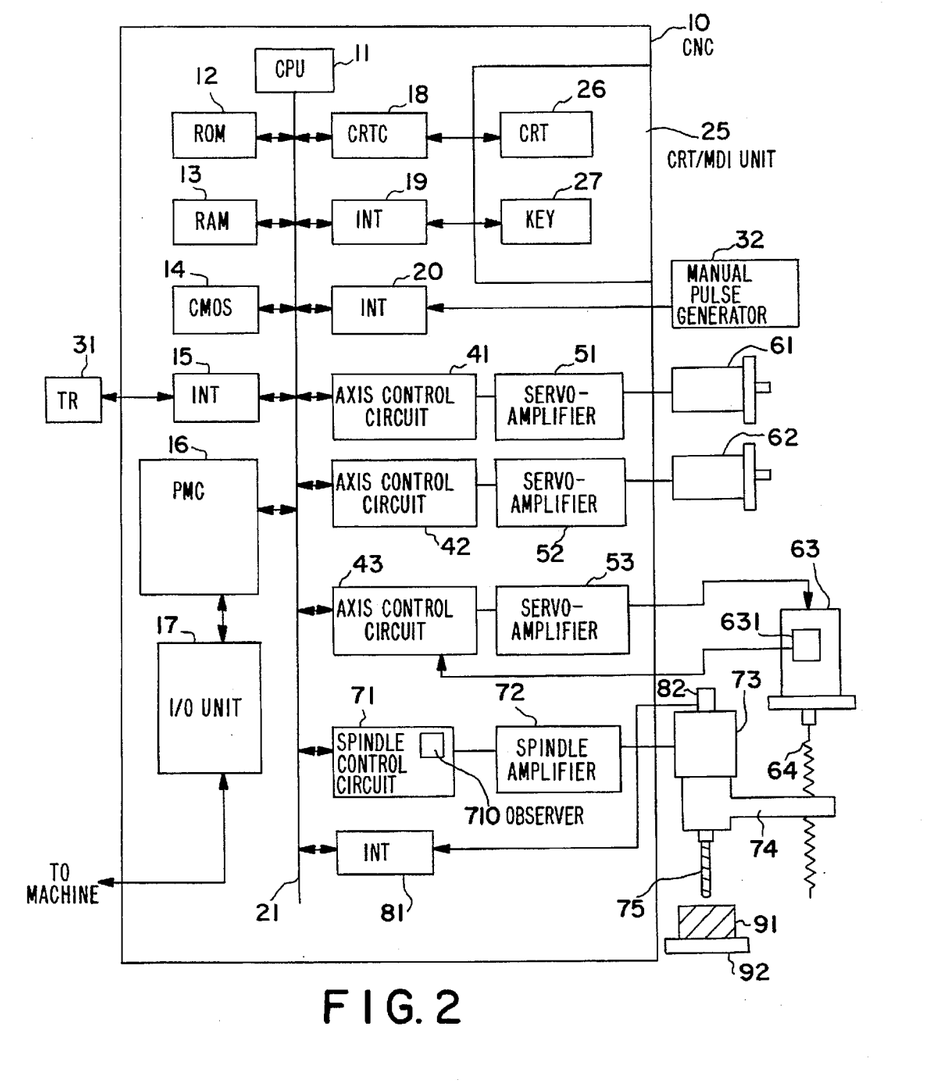
FIG. 2 is a block diagram of a hardware arrangement of a numerical control apparatus for implementing a drilling system according to the present invention.

FIG. 2 shows in block form a hardware arrangement of a computerized numerical control (CNC) apparatus which implements a drilling system according to the present invention. As shown in FIG. 2, the computerized numerical control apparatus is indicated by the reference numeral 10. The computerized numerical control apparatus 10 has a central processor (CPU) 11 for controlling the computerized numerical control apparatus 10 in its entirety. The central processor 11 reads a system program stored in a read-only memory (ROM) 12 through a bus 21, and executes control over the computerized numerical control apparatus 10 in its entirety according to the system program. A random-access memory (RAM) 13 stores temporary calculated data and display data. The random-access memory 13 comprises a DRAM. A nonvolatile memory (CMOS) 14 stores a machining program and various parameters. The nonvolatile memory 14 is backed up by a battery (not shown), so that the stored data will be retained in the event of a power failure of the computerized numerical control apparatus 10.

An interface 15 serves to interface the computerized numerical control apparatus 10 with an external device 31 which may be a tape reader, a tape puncher, or a tape reader/puncher. A machining program can be read from the external device 31 which comprises a tape reader through the interface 15, and a machining program edited in the computerized numerical control apparatus 10 can be outputted to the external device 31 which comprises a tape puncher through the interface 15.

A programmable machine controller (PMC) 16 is provided in the computerized numerical control apparatus 10 for controlling a machine tool according to a sequence program which is generated in ladder form. Specifically, the programmable machine controller 16 converts an M function, an S function, and a T function which are commanded by the machining program, into signals required by the machine tool according to the sequence program, and outputs the converted signals from an input/output (I/O) unit 17. The outputted signals are supplied to energize electromagnets on the machine tool and operates hydraulic valves, pneumatic valves, and electric actuators. The programmable machine controller 16 also processes signals from limit switches on the machine tool and switches on a machine control console (not shown), and delivers the processed signals to the processor 11.

A graphic control circuit 18 converts digital data including the present positions of the axes, alarms, parameters, and image data into image signals, which are sent to a display device 26 of a CRT/MDI (Cathode-Ray Tube/Manual Data Input) unit 25, and displayed on the display device 26. An interface 19 receives data from a keyboard 27 in the CRT/MDI unit 25, and delivers the received data to the processor 11.

An interface 20 is connected to a manual pulse generator 32 for receiving pulses generated by the manual pulse generator 32. The manual pulse generator 32 is mounted on the machine control console for manually positioning mechanical operable parts accurately.

Axis control circuits 41-43 receive motion commands for the respective axes from the processor 11, and outputs commands for the respective axes to servoamplifiers 51-53, respectively. In response to the commands, the servoamplifiers 51-53 energize respective servomotors 61-63 for the respective axes. The servomotor 63 which controls the feeding of a Z-axis rotates a ball screw 64 to control the position and feeding velocity of a spindle head 74 connected to a spindle motor 73 in the direction of the Z-axis. The servomotor 63 has a built-in pulse coder 631 for detecting the position of the spindle head 74. A positional signal from the pulse coder 631 is fed as a pulse train back to the axis control circuit 43. Although not shown, the servomotors 61, 62 which control the feeding of X-and Y-axes, respectively, have respective built-in pulse coders for positional detection. These pulse coders also feed positional signals as pulse trains back to the axis control circuits 41, 42. Linear scales may be used as such position detectors.

A spindle control circuit 71 receives a spindle rotation command and a spindle orientation command, and outputs a spindle velocity signal to a spindle amplifier 72. In response to the spindle velocity signal, the spindle amplifier 72 energizes the spindle motor 73 to rotate at a rotational velocity commanded by the spindle rotation command. The spindle amplifier 72 also positions the spindle at a position indicated by the spindle orientation command.

A position coder 82 is coupled to the spindle motor 73 through gears or a belt. The position coder 82 rotates in synchronism with the spindle motor 73, outputs feedback pulses through an interface 81 to the processor 11 which reads the feedback pulses. The feedback pulses serve to move the other axes synchronously with the spindle motor 73 to make it possible to effect machining such as drilling. The feedback pulses may be converted into a velocity signal X1s by way of F/V (frequency-to-velocity) conversion.

The spindle control circuit 71 has a processor (not shown) for executing software processing to perform functions, one of which is an observer 710. The observer 710 estimates a disturbance load torque Ys acting on the spindle motor 73 in response to the velocity signal X1s, etc. The disturbance load torque Ys is sent to the processor 11, which reads the disturbance load torque Ys and carries out a predetermined process. The observer 710 and the process carried out by the processor 11 will be described in detail later on.

A cutter having a plurality of cutting edges, e.g., a milling cutter 75, is mounted on the spindle head 74 of the spindle motor 73. The rotation of the milling cutter 75 is controlled by the spindle motor 73. The position and feeding velocity of the milling cutter 75 in the direction of the Z-axis are controlled by the servomotor 63 through the spindle head 74.

The milling cutter 75 is fed and positioned in the Z-axis direction by the servomotor 63. A workpiece 91 is fixedly mounted on a table 92 which is controlled to move in the X-and Y-axis directions by the respective X-and Y-axis servomotors 61, 62 through mechanisms, not shown. The workpiece 91 is milled by the milling cutter 75 while being thus controlled to move.

Figure 3:
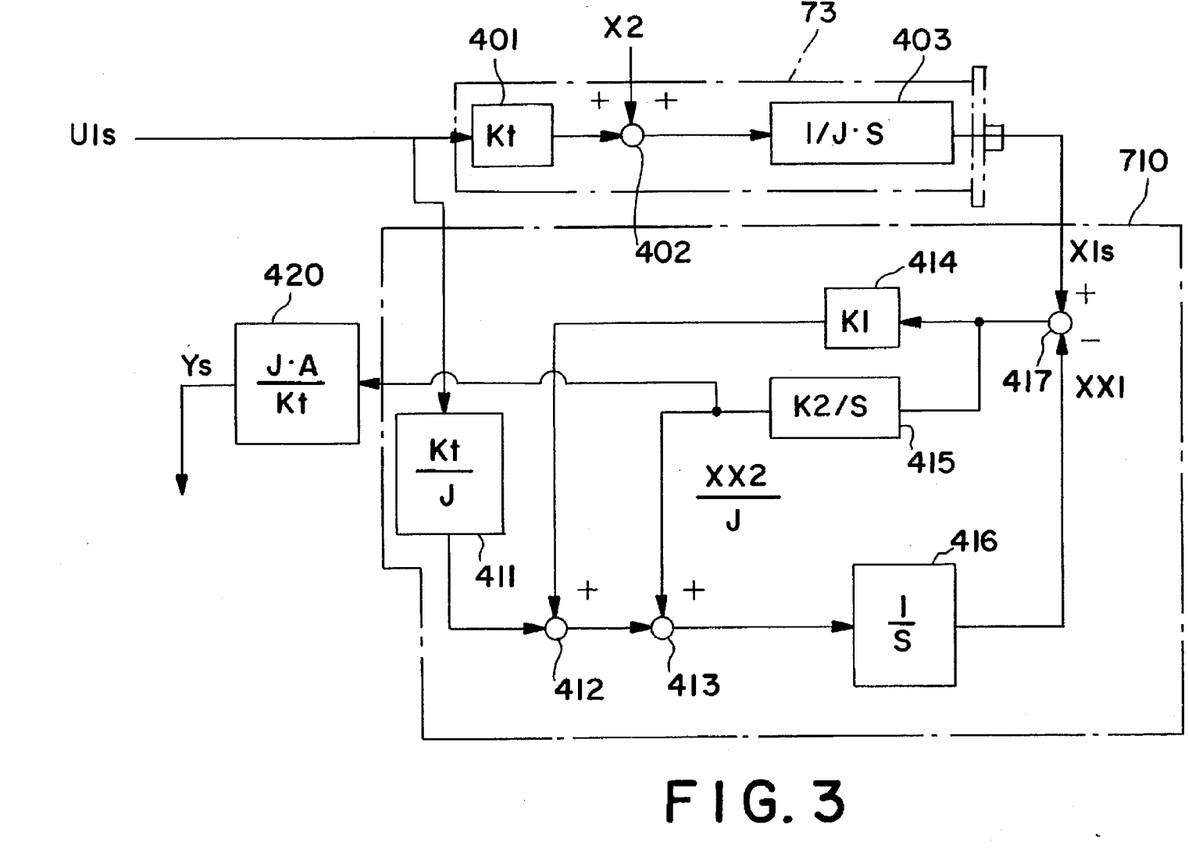
FIG. 3 is a block diagram of an observer for estimating a disturbant load torque.

The observer 710 for estimating a disturbance load torque will be described below. A technical concept for obtaining a disturbance load torque with an observer has already been disclosed in Japanese laid-open patent publication No. 3-196313 filed by the present applicant.

FIG. 3 shows in block form an observer for estimating a disturbance load torque. The disturbance load torque includes disturbance load torques such as a cutting load torque, a frictional torque of mechanisms, and so on, and is equal to all torques of the spindle motor except for acceleration and deceleration torques for accelerating and decelerating the spindle motor. The processing shown in the block diagram of FIG. 3 is executed by the observer 710 of the spindle control circuit 71.

In FIG. 3, a current command value U1s is a torque command value which is outputted to the spindle motor 73 in response to a spindle rotation command from the processor 11. The current command value U1s is applied to an element 401 to energize the spindle motor 73. To an output torque of the spindle motor 73, there is added a disturbance load torque X2 by an arithmetic element 402. An output signal from the arithmetic element 402 is converted into a velocity signal X1s by an element 403 where J represents the inertia of the spindle motor 73.

The current command value U1s is also applied to the observer 710. The observer 710 estimates a disturbance load torque from the current command value U1s and the velocity X1s of the spindle motor 73. Velocity control of the spindle motor 73 is omitted here, and only processing operations for estimating a disturbance load torque will be described below. The current command value U1s is multiplied by (Kt/J) by an element 411, and then outputted to an arithmetic element 412. To an output signal from the arithmetic element 412, there is added a feedback signal from a proportional element 414 by an arithmetic element 412, and then there is added a feedback signal from an integral element 415 by an arithmetic element 413. Output signals from the arithmetic elements 412, 413 are expressed in a unit of acceleration. The output signal from the arithmetic element 413 is applied to an integral element 416, which outputs an estimated velocity XX1 for the spindle motor 73.

The difference between the estimated velocity XX1 and the actual velocity X1s is determined by an arithmetic element 417, and fed back to the proportional element 414 and the integral element 415. The proportional element 414 has a proportionality constant K1 which is expressed in a unit of sec$^{-1}$. The integral element 415 has an integration constant K2 which is expressed in a unit of sec$^{-2}$.

The output signal (XX2/J) of the integral element 415 is determined by the following equation:

$$(XX2/J) = (X1s - XX1) \cdot (K2/S)$$
$$= (X2/J) \cdot [K2/(S^2 + K1 \cdot S + K2)].$$

By selecting the constants K1, K2 in order to stabilize the polarity, the above equation is expressed as follows:

$$(XX2/J) = (X2/J)$$
$$XX2 = X2.$$

Therefore, the disturbance load torque X2 can be estimated by XX2. The output signal from the integral element 415 is representative of an estimated acceleration (XX2/J)

which is produced by dividing an estimated disturbance load torque XX2 by J, and is converted into a current value by a proportional element 420. For a torque representation, the current value is represented by an estimated disturbance load torque Ys. J represents the inertia of the spindle motor 73 as with J in the element 403, and Kt is the same as the torque constant of the element 401. A represents a coefficient which is of a numerical value of 1 or less and used to correct the estimated acceleration (XX2/J). In this manner, the disturbance load torque Ys (X2) of the spindle motor 73 can be estimated using the observer 710. Though the estimated disturbance load torque Ys is of an estimated value, since Ys is described simply as a disturbance load torque in FIG. 2, it will be referred to as a disturbance load torque below.

Figure 1:
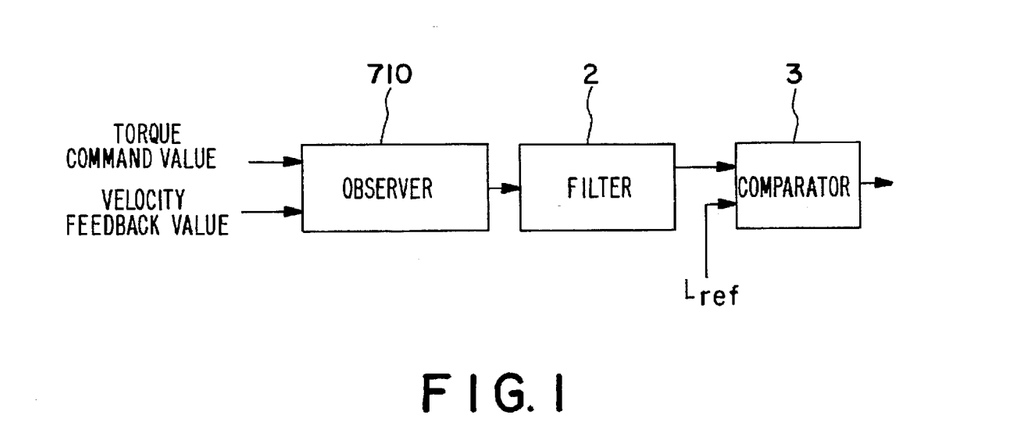
FIG. 1 is a block diagram of a cutter fracture detecting system according to the present invention.

FIG. 1 shows in block form a cutter fracture detecting system according to the present invention. As shown in FIG. 1, the cutter fracture detecting system comprises the observer 710, a filter 2, and a comparator 3.

The observer 710 is one of the functions that are performed by the spindle control circuit 71. In response to a torque command value and a velocity feedback value, the observer 710 calculates a disturbance load torque of the spindle motor 73. The calculated disturbance load torque represents a torque which is involved purely in a machining process, produced by subtracting acceleration and deceleration torques from all output torques of the spindle motor 73.

The filter 2 is a band rejection filter for removing a certain frequency component of the disturbance load torque, and may comprise a twin T filter. Since the disturbance load torque generally contains a frequency component that is determined by the rotational velocity of the cutter and the number of cutting edges of the cutter, the filter 2 is used to eliminate the frequency component. If the disturbance load torque contains two or more frequency components, then a plurality of band rejection filters each having one of the frequency components at a central frequency thereof may be connected in series with each other.

Figure 4:
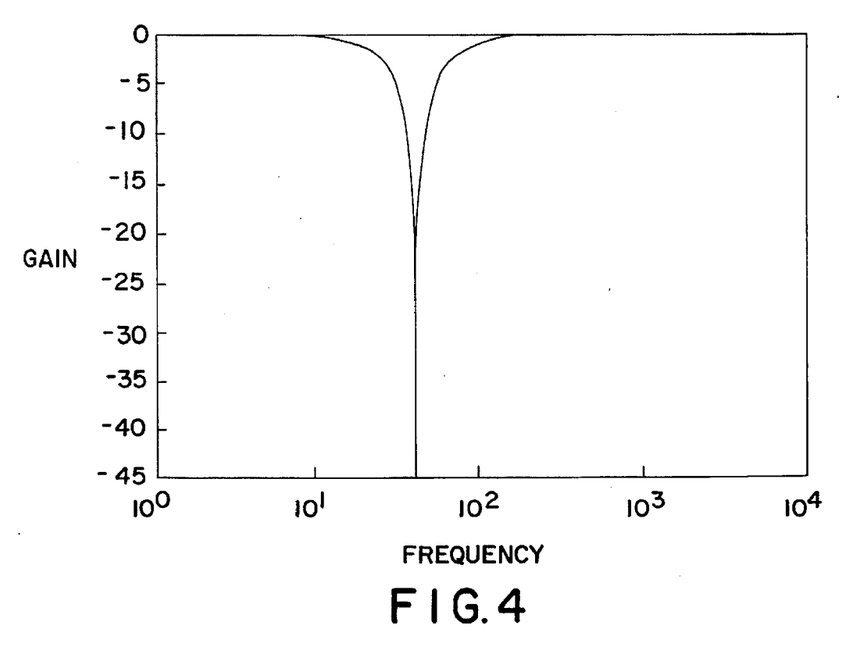
FIG. 4 is a diagram showing frequency characteristics of a band rejection filter.

FIG. 4 shows frequency characteristics of the band rejection filter. As shown in FIG. 4, the band rejection filter has a sharp attenuation curve at a frequency which is determined by the rotational velocity of the cutter and the number of cutting edges of the cutter, e.g., at a frequency of 40 Hz.

Figure 5:
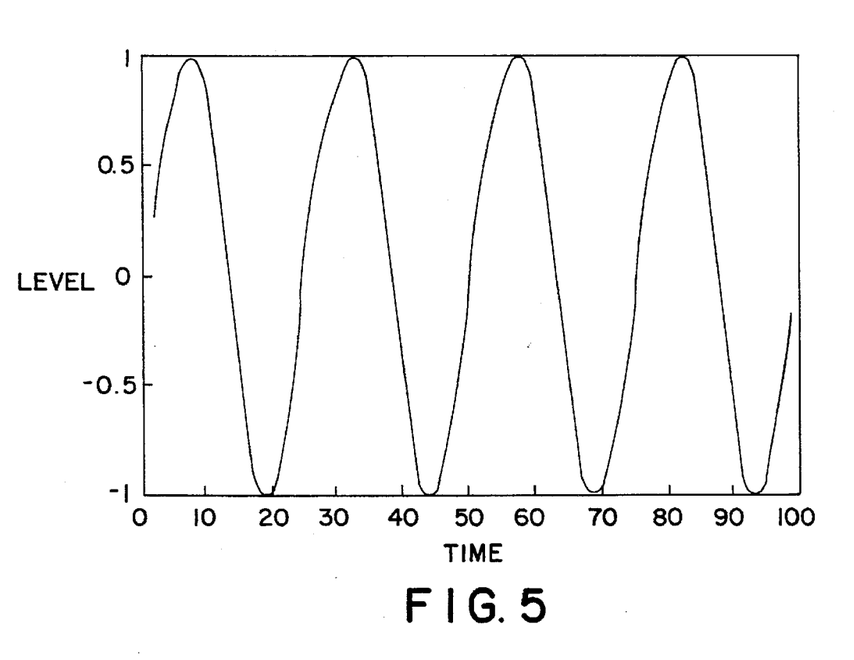
FIG. 5 is a diagram showing, by way of example, a filter input signal when a cutter is in a normal condition.

FIG. 5 shows, by way of example, a filter input signal when the cutter is in a normal condition. When the cutter is in a normal condition with neither of its cutting edges being fractured, the frequency which is determined by the rotational velocity of the cutter and the number of cutting edges of the cutter varies. When all the cutting edges engage the workpiece equally, the filter input signal is of a signal waveform having the same amplitude.

Figure 6:
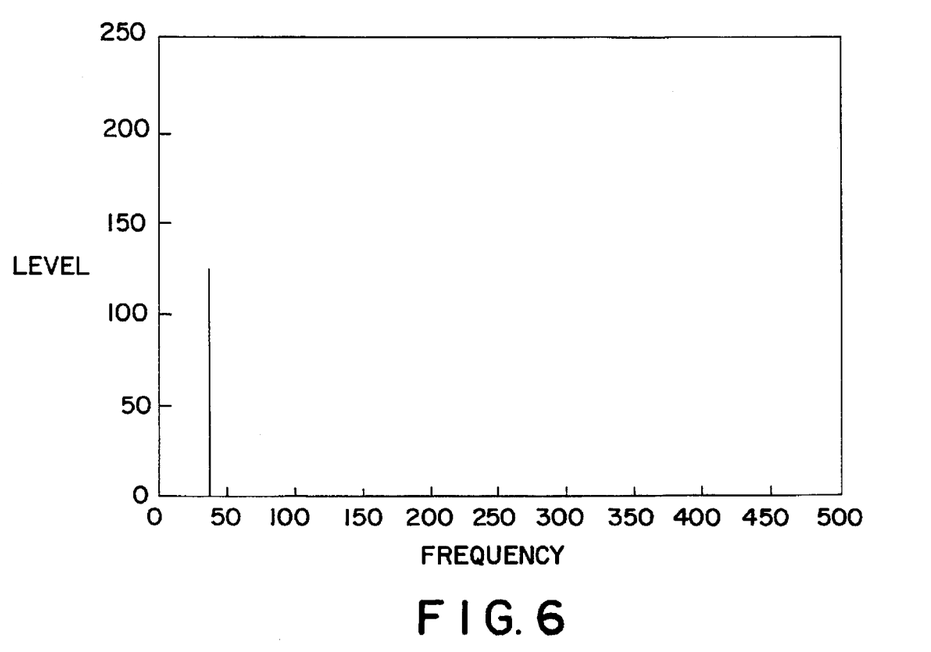
FIG. 6 is a diagram showing, by way of example, frequency components of a signal inputted to the filter when the cutter is in a normal condition.

FIG. 6 shows, by way of example, frequency components of a signal inputted to the filter when the cutter is in a normal condition. In the example shown in FIG. 6, the frequency which is determined by the rotational velocity of the cutter and the number of cutting edges of the cutter is 40 Hz.

Figure 7:
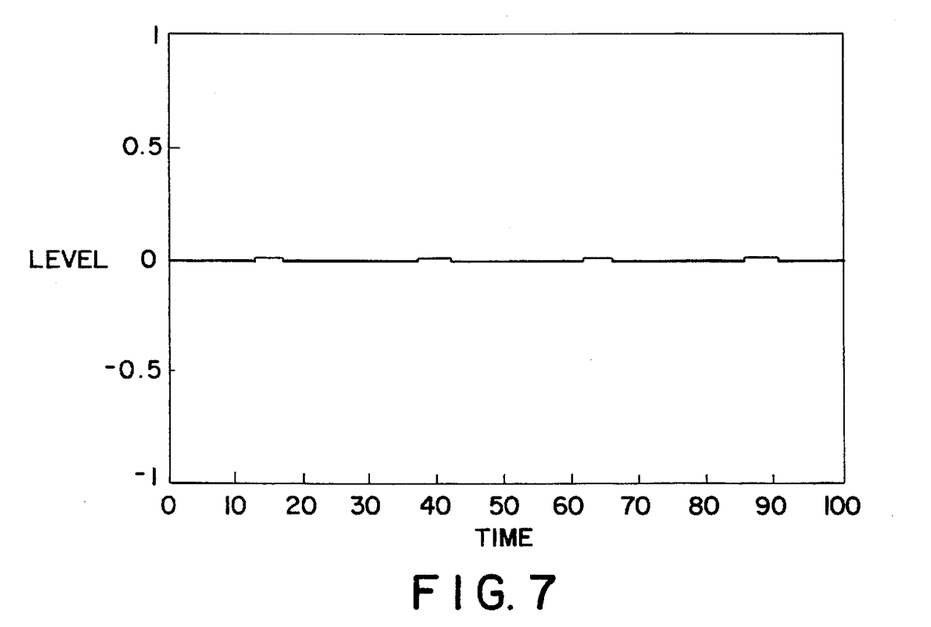
FIG. 7 is a diagram showing, by way of example, a filter output signal when the cutter is in a normal condition.

FIG. 7 shows, by way of example, a filter output signal when the cutter is in a normal condition. In FIG. 7, the signal having the frequency of 40 Hz is sufficiently attenuated by the band rejection filter, and the filter 2 produces substantially no output signal.

Figure 8:
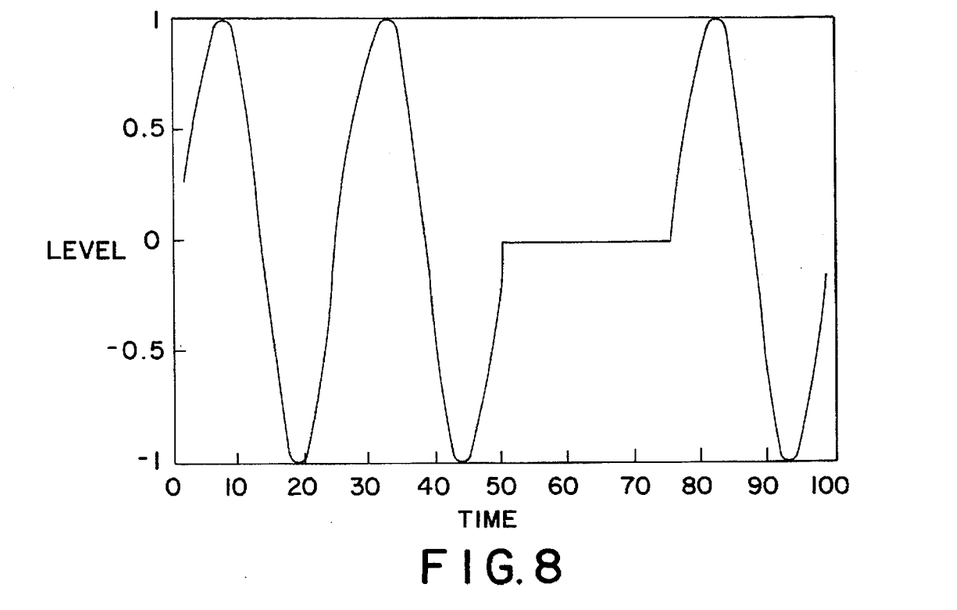
FIG. 8 is a diagram showing, by way of example, a filter input signal when the cutter is in a fractured condition.

FIG. 8 shows, by way of example, a filter input signal when the cutter is in a fractured condition. When one of the cutting edges of the cutter is fractured, a portion of the waveform of an input signal applied to the filter 2 varies as shown in FIG. 8.

Figure 9:
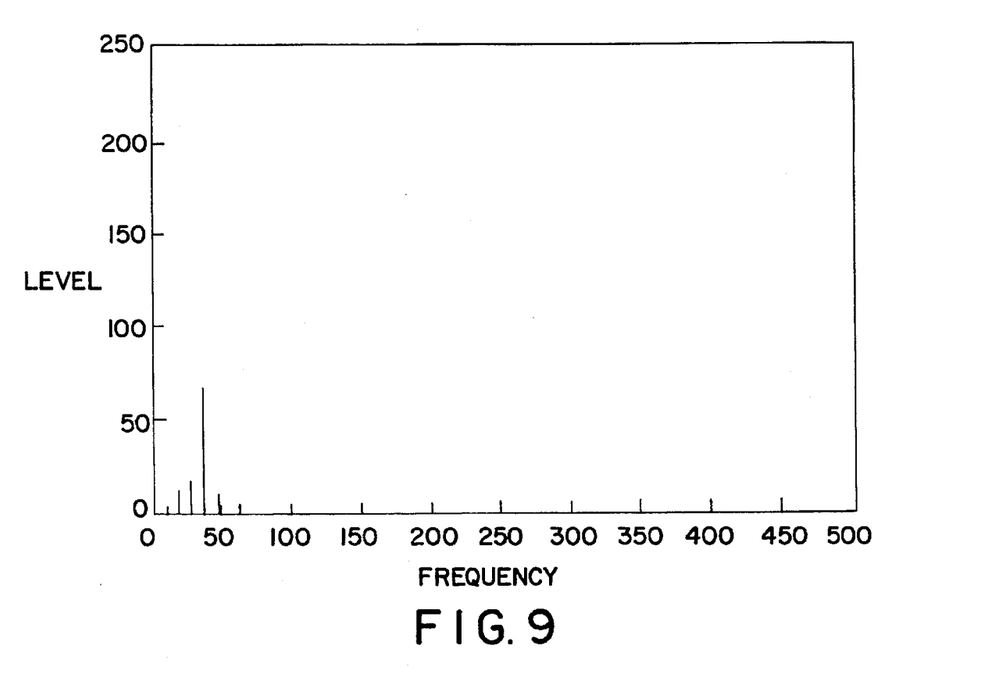
FIG. 9 is a diagram showing, by way of example, frequency components of a signal inputted to the filter when the cutter is in a fractured condition.

FIG. 9 shows, by way of example, frequency components of a signal inputted to the filter when the cutter is in a fractured condition. In the example shown in FIG. 9, several frequency components are generated around the frequency of 40 Hz which is determined by the rotational velocity of the cutter and the number of cutting edges of the cutter.

Figure 10:
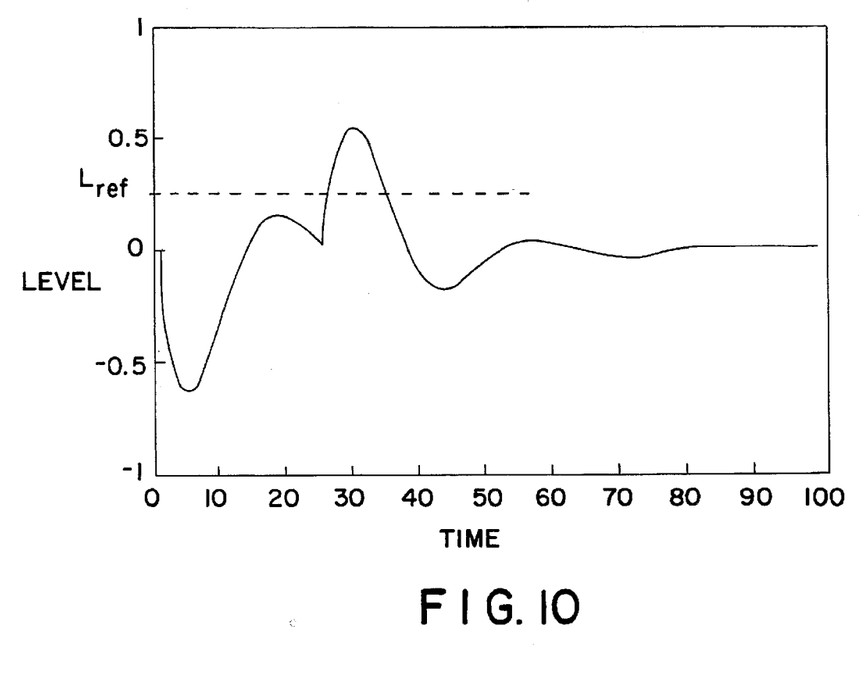
FIG. 10 is a diagram showing, by way of example, a filter output signal when the cutter is in a fractured condition.

FIG. 10 shows, by way of example, a filter output signal when the cutter is in a fractured condition. In FIG. 10, when a signal having frequency components as shown in FIG. 9 passes through the band rejection filter having a central frequency of 40 Hz, a varied frequency component is not rejected, but outputted from the filter.

Referring back to FIG. 1, the comparator 3 is connected to the output terminal of the filter 2. Specifically, one of the input terminals of the comparator 3 is connected to the output terminal of the filter 2, and the other input terminal of the comparator 3 is supplied with a predetermined reference value. The reference value may be of a level Lref as shown in FIG. 10.

The comparator 3 monitors the output signal from the filter 2. When a frequency component is varied by a fracture of the cutter, the level of the output signal from the filter 2 exceeds the reference value Lref, and the comparator 3 outputs a signal indicative of the fracture of the cutter. The fracture of the cutter can thus be detected.

The signal outputted from the comparator 3 is temporarily stored as being latched, for example, and transmitted to the processor 11 in the computerized numerical control apparatus 10. Based on the signal from the comparator 3, the processor 11 instructs the computerized numerical control apparatus 10 to stop the machining process, issue an alarm, and change the cutter.

In the above embodiment, the signal outputted from the comparator 3, which indicates a detected cutter fracture, is sent to the computerized numerical control apparatus 10 for various processes. However, the signal outputted from the comparator 3 may be used by the programmable machine controller 16 or an external device connected to the computerized numerical control apparatus 10.

With the present invention, as described above, inasmuch as a fracture of a cutter having a plurality of cutting edges is detected based on a varied frequency component of a disturbance load torque, a fracture of a cutting edge can be detected easily and reliably. Detection of a fracture of a cutter is highly accurate because a disturbance load torque is used as a basis for detecting such a fracture of a cutter.

We claim:

1. A cutter fracture detecting system for detecting a fracture of a cutter which has a plurality of cutting edges, comprising:

an observer to calculate a disturbance load torque of a spindle motor from a torque command value and a velocity feedback value;

a band rejection filter to remove a given frequency component of said disturbance load torque which is determined by a number of the plurality of cutting edges of the cutter and a rotational speed of the cutter; and a comparator to compare an output signal from said band rejection filter with a predetermined reference value, and to output a signal indicative of a fracture of the cutter when said output signal exceeds said predetermined reference value.

2. A cutter fracture detecting system according to claim 1, wherein said cutter includes a milling cutter.

3. A cutter fracture detecting system according to claim 1, further comprising a spindle control circuit to control said spindle motor, said spindle control circuit including said observer.

* * * * *